United States Patent Office 3,455,823
Patented July 15, 1969

3,455,823
ORGANIC SUSPENDING MEDIUM AND
COMPOSITION
Franklin I. L. Lawrence, Bradford, and Michael J. Pohorilla, Berwyn, Pa., assignors to Kendall Refining Company, a corporation of Pennsylvania
No Drawing. Continuation-in-part of application Ser. No. 540,159, Oct. 12, 1955. This application Mar. 25, 1966, Ser. No. 537,266
Int. Cl. C10m 1/10
U.S. Cl. 252—25         10 Claims

ABSTRACT OF THE DISCLOSURE

A composition of matter and a method of incorporating in oleaginous compositions a normally oil-insoluble alkaline earth metal salt stably dispersed in an oxygen-condensed petroleum hydrocarbon resin produced by contacting a hydrocarbon starting material having an ebullioscopic molecular weight in excess of about 500 and an SUS viscosity at 210° F. of at least about 400 and a bromine number less than 10 and condensed by heating the resin at a temperature of at least 400° F. with free oxygen, thereafter blending an oil compatible alkaline earth organic salt with the oxygen condensed resin, contacting the mixture with an acidic gas and removing the acidic organic constituent.

---

This application is a continuation in part of application Ser. No. 540,159 filed Oct. 12, 1955, now abandoned.

This invention relates broadly to the incorporation of oil-insoluble materials into oleaginous compositions. More particularly, this invention relates to oil-compatible, oxygen-condensed hydrocarbons containing suspended, normally oil-insoluble materials and to oleaginous compositions having said oxygen-condensed hydrocarbons with suspended oil-insoluble materials blended therewith. Additionally, this invention encompasses methods whereby normally oil-insoluble materials may be uniformly dispersed throughout an oil-compatible, oxygen-condensed hydrocarbon suspending medium.

In a vast number of industrial applications, it has been found exceedingly desirable to effect a stable blending of normally oil-insoluble materials in oleaginous compositions. Thus, it is desirable to effect a stable dispersion of a wide variety of organic and inorganic oil-insoluble additives in lubricants to enhance the properties of the lubricant. Alkaline earth carbonates, for example, possess excellent detergent properties and successfully counteract the formation of acids in lubricating compositions. Additionally, such oil-insoluble compounds as boric acid, boric acid esters, ascorbic acid, and the like, are known to impart excellent antioxidant characteristics to lubricants. The limited solubility of these materials in oil, however, has greatly restricted their application as lubricant additives.

In other areas, it is also advantages to effect a stable blending of oil-insoluble materials with oleaginous compositions. For example, it is desirable to blend oil-insoluble copper anti-fouling compounds with oleaginous marine coating compositions and oil-insoluble anti-fungus and anti-termite materials with other oleaginous coatings. Since it often is necessary to reduce a coating composition to the fluid state with heat or solvents prior to application, it is essential that the oil-insoluble materials remain uniformly distributed throughout the coating composition while the composition is in such fluid or semi-fluid state.

It is an object of the invention to provide oleaginous compositions having normally oil-insoluble materials stably suspended therein.

It is another object of this invention to provide noncorrosive oleaginous compositions having normally oil-insoluble materials stably suspended therein.

It is an additional object of the invention to provide a lubricant which demonstrates high detergency characteristics.

It is a further object of the invention to provide a lubricant having high oxidation stability.

It is a still further object of the invention to provide oleaginous coating compositions having normally oil-insoluble materials stably suspended therein.

It is yet another object of the invention to provide a process whereby oil-insoluble compounds may be incorporated into oxygen-condensed hydrocarbons.

In accordance with this invention, there is provided a composition of matter ideally suited for incorporation into oleaginous compositions which comprises a normally oil-insoluble material stably dispersed in an oil-compatible, oxygen-condensed petroleum hydrocarbon resin produced by contacting a hydrocarbon starting material having an ebullioscopic molecular weight in excess of about 500, while at a temperature of at least 400° F. (preferably about 425° F. to about 575° F.), with a free oxygen-containing gas for a period of time requisite to produce a fiinal condensation product effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The present invention is bottomed on the discovery that the herein described noncorrosive, substantially oil-compatible, oxygen-condsensed hydrocarbons are excellently suited as a suspending medium or vehicle for oil-insoluble materials to effect a stable suspension of the oil-insoluble materials in oleaginous compositions. While the oxygen-condensed hydrocarbons which constitute the vehicle of the present invention are somewhat heterogeneous in character and are not capable of precise identification, it appears that the condensation reaction produces a material which, at least in substantial part, partakes of a microgel structure. It is this microgel structure which seemingly is responsible for the remarkable effectiveness of these compositions as suspending mediums for oil-insoluble materials.

The term "microgel" as referred to herein denotes hydrocarbons condensed to superpolymeric size, each superpolymeric molecule being essentially a small particle of condensate approximating colloidal dimensions. In accordance with this invention, the oil-insoluble materials are colloidally dispersed in the oxygen-condensed microgel suspending medium and the oxygen-condensed suspending medium containing colloidally dispersed oil-insoluble materials then is incorporated into an oleaginous composition. Alternatively, the oxygen-condensed suspending medium may be incorporated into an oleaginous composition and the oil-insoluble material thereafter dispersed in the suspending medium. While the oxygen-condensed microgels of the present invention are oil-compatible, they do not form a true molecular solution with oils, but rather are uniformly suspended throughout the oil as small particles, each particle having approximately colloidal dimensions. Thus the microgels of the present invention, themselves containing colloidally dispersed oil-insoluble materials, effect a uniform distribution of oil-insoluble materials throughout oleaginous base compositions.

The oxygen-condensed microgels of this invention may be employed to incorporate a wide variety of normally oil-insoluble organic and inorganic materials in oleaginous compositions. The oxygen-condensed microgels may be employed to incorporate elemental compounds such as sulfur; metal inorganic salts such as alkaline earth carbonates, alkaline earth chlorides, alkaline earth sulfides; molybdenum sulfides, and the like; solid inorganic acids such as boric acid, and the like, metal organo compounds such as cupric acetate, antimony acetate, boric acid esters, barium carbonate, -n-butyl dithiophosphoric acid complexes, and the like; and normally solid organic compounds such as pentachlorophenol, ascorbic acid, β-naphthylphenylamine, di-β-naphthylamine, phenothiazine, and the like.

The compositions of the present invention may be incorporated into all varieties of oleaginous compositions. They may be employed in oils and greases derived from Pennsylvania crude oil, mid-continent crude oil, asphalt base oils, and all other types of mineral oils as well as synthetic oils including the synthetic ester type oils such as di-2-hexylethyl sebacate and di-2-ethylhexyl adipate, and phosphonate oils, such as dibutyl diphosphonate oils, tetrabutyl tetramethylene diphosphonate, and bis-(2-ethylhexyl) 2-ethylhexyl phosphonate. Additionally, the compositions of the present invention may be incorporated into tar and tarlike coating compositions, as well as compositions generally having an oleaginous base.

The oxygen-condensed resin containing oil-insoluble material may be incorporated into oleaginous-base compositions at ambient temperatures if the oleaginous composition is sufficiently fluid to effect a dispersion of the suspending mediums. In the event that the oleaginous-base composition is extremely viscous or solid at ambient temperatures, the compositions of the present invention may be blended with the oleaginous base at elevated temperatures or by the utilization of diluent oils.

The amount of oil-insoluble material to be incorporated into an oleaginous composition will vary depending upon the particular application. In the case of barium carbonate or other antacid compounds in lubricating compositions, it may be desirable to incorporate as much as possible. In the case of fungicides, antioxidants and the like, small quantities, such as .05% or less may accomplish the desired result.

In the interests of orderly presentation, the preparation of the oxygen-condensed microgel first will be described and methods for incorporating the oil-insoluble materials into the suspending medium subsequently will be discussed.

The oxygen-condensed hydrocarbons of this invention are usually characterized by a ring and ball softening point, as measured by A.S.T.M. Method E 28–42T, of more than about 80° F. Some microgels comprehended by the invention have a ring and ball softening point or viscosity too low to be effectively measured in accordance with the aforementioned procedure. Such materials are characterized by a viscosity of at least about 400 SUS at 210° F., preferably at least about 1000 to 5000 SUS at 210° F., and, in any event, a viscosity of at least about 200 SUS at 210° F. greater than the hydrocarbon starting materials from which microgels are produced.

The degree of oxygen condensation contemplated by the present invention most appropriately may be measured by determining the effectiveness of the oxygen-condensed product as a viscosity-index improving agent. Thus, the oxygen-condensed microgel contemplated by the present invention must be effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The hydrocarbon starting materials which are employed in the production of the microgel suspending medium of the invention must be characterized by an average ebullioscopic molecular weight of at least about 500, preferably at least about 1000. An optimum average ebullioscopic molecular weight range is from about 1200 to 1700. Similarly, the hydrocarbon starting materials employed in preparation of the microgel suspending medium of the invention will be characterized by an SUS viscosity at 210° F. of between about 60 and about 15,000. The preferred materials with a molecular weight of at least about 1000 are further characterized by a viscosity in excess of about 900 SUS at 210° F.

The most appropriate starting materials for the production of the microgels of the invention are suitable crude oil fractions. Appropriate fractions derived from crude oils of any source, including Pennsylvania crude oils, mid-continent crude oils, West Coast crude oils, Canadian crude oils, and the like, can be employed. All types of crude oils, including paraffin base crude oils, asphalt base crude oils, and napthenic crude oils provide suitable sources from which petroleum fractions useful in the production of the microgels of the invention can be derived.

With respect particularly to fractions derived from Pennsylvania crude oils, it is preferred that the hydrocarbon starting materials from which the microgels of this invention are produced be characterized by a bromine number not in excess of 10. Many of the pure, high-molecular-weight hydrocarbons suitable as starting materials are characterized by a bromine number of 0.

It is additionally preferred that hydrocarbons which are utilized as starting materials for the production of the microgels of the invention contain more than about 2 naphthenic rings per molecule. The rings individually can be integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and most appropriately are employed as starting materials for the production of microgels designed for use in synthetic lubricating oil compositions such as the diester oils.

Additionally, it is preferred that the petroleum fractions from which the microgels of the invention are produced contain not more than about 10% of wax-type materials. (The wax content herein referred to is determinable by a procedure similar to that described under A.S.T.M. designation D–721–51T with the exception that methyl isobutyl ketone is employed to precipitate the wax, the sample size is reduced to 0.5 gram, and the determination is conducted at 0° F.) While the starting materials which contain substantially more than 10% by weight of wax as determined by this test (e.g., petrolatum which may reflect a wax content on the order of 40% by weight) can be employed in the production of the microgels of the invention, such materials are not preferred. Such materials best can be used by being blended with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the microgels employed in this invention. Hydrocarbons precipitated by conventional propane precipitation processes from such residual stocks are particularly suitable.

Further refinement of such propane-precipitated high-molecular-weight hydrocarbons, which include both light and heavy resin fractions, by extraction with furfural or phenol in conventional manner, yields a raffinate from which microgels of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffnate. More drastic extraction, for example, to yield 50% to 60% raffnates, may be practiced to obtain still more desirable starting materials for the production of the microgels of the invention.

The most preferred starting material for the production of the dispersing mediums of this invention embraces a solvent-extracted Pennsylvania crude oil fraction which has a molecular weight of from about 1200 to about 1700 and a bromine number of not more than about 4, which is substantially wax- and asphalt-free, which contains not more than about 5% by weight of hydrocarbon molecules containing more than 50% aromatic carbon atoms, and which consists primarily of hydrocarbon molecules containing an average of from about 2 to about 7 naphthenic rings.

The microgels of the present invention are produced by contacting an appropriate hydrocarbon starting material, while at a temperature of at least about 400° F., preferably from about 425° F. to about 575° F., with a free oxygen-containing gas for a time requisite to produce the final condensation product having a viscosity of at least 200 SUS at 210° F. greater than the original starting material.

There can be employed in the condensation process by which the dispersing mediums of this invention are produced any free oxygen-containing gas. Air is preferred for obvious economic reasons. Substantially pure gaseous oxygen can be employed as well as gaseous oxygen combined with inert diluents such as carbon dioxide, nitrogen and the like. Reactive materials such as chlorine, hydrogen chloride, phosphorus pentoxide, and like materials, which serve as activators, appropriately may be introduced into the reaction mixture in conjunction with the free oxygen-containing gas. Conventional catalysts known to the art may be employed, if desired.

The rate of supply of free oxygen to the reaction mixture is not a critical aspect of this invention. In general, free oxygen-containing gas is passed through the reaction mixture at a rate sufficient to provide at least about 10 cu. ft. of free oxygen per gallon of hydrocarbon material per hour. Preferably, free oxygen is supplied to the reaction mixture at a rate of from about 11 cu. ft. to about 27 cu. ft. per gallon of hydrocarbon per hour. The corresponding air rates are at least about 50 cu. ft. to about 135 cu. ft. per gallon of hydrocarbon per hour. Normally the condensation reaction is completed in about 8 hours. The time required for the reaction is a function of the temperature at which the process is carried out, the ring and ball softening point desired in the final condensation product, and more particularly the rate at which the heat of reaction can be dissipated. The reaction time alone does not constitute a critical aspect of this invention.

For some applications, it may be desired further to enhance the resistance to oxidation or otherwise improve the condensation products which are employed in the invention. Such modifications effected, inter alia, through chemical modification of the hydrocarbonaceous condensation products, hereinafter described, produce nonequivalent materials. More specifically, the oxidation resistance of such condensation products is increased by further chemical treatment to neutralize reactive groups and/or simultaneously build antioxidant properties into the molecular structure.

Polyalkylene polyamines derived from ethylene diamine, such as diethylene triamine, triethylene tetramine, tetraethylene pentamine; aromatic amines such as diphenylamine and o-phenylenediamine; ammonia, and the like, or mixtures thereof, are also suitable modifying agents for the otherwise unmodified hydrocarbonaceous condensation products of the invention. Elemental sulfur is likewise a suitable modifying agent for the dispersing medium of this invention.

Additionally, the various isocyanates which correspond to the following formula:

(I) $\qquad R(N{=}C{=}O)_n$ in which R is an alkyl group containing from 1 to 10 carbon atoms, and $n$ is any integer from 1 to 3 inclusive, can be employed to modify the oxygen condensation products of the invention. Typical alkyl groups which are represented by R include methyl, ethyl, propyl, isopropyl, butyl, isobutyl, hexyl, octyl, decyl, and the like. R may also be aryl, including tolyl, phenyl, diphenyl methane, alpha-naphthyl, and the like, in the foregoing isocyanate formulae.

As illustrated in the examples, the aforementioned inorganic and organic reagents are utilized, alone or in combination, by heating a mixture of the condensation product and the selected reagent or reagents at an appropriate temperature for a short period of time. In general, at least about 0.25% by weight, preferably about 0.25% to about 5.0% by weight of the organic or inorganic reagents, or mixtures thereof, are employed, based on the weight of the condensation product. Such quantities generally afford an excess of the reagent, which is not objectionable. The temperature and time of the reaction are not critical. A temperature of from about 175° F. to about 500° F. and a reaction time of at least about 20 minutes, preferably from about 20 to 120 minutes, can be observed with satisfactory results. The reaction may be conducted under an inert atmosphere, if desired. In the case of certain of the organic reagents, temperatures must be controlled to prevent decomposition. A preferred procedure is to convert the hydrocarbon fraction employed as a starting material to an oxygen condensation product having a ring and ball softening point somewhat below, for example, 10 to 20° below the softening point desired in the final product, followed by reaction with the above-described reagents to an extent requisite to raise the ring and ball softening point to the ultimately desired value.

Additionally, the hydrocarbon starting material initially may be condensed with oxygen to produce an intermediate product which is further reacted with phosphorus pentasulfide, the phosphorus pentasulfide reaction product being finished by condensation with additional sulfur to produce a final product of the desired ring and ball softening point. More particularly, there may be employed in such processes up to about 5% by weight, based on the hydrocarbon, of phosphorus pentasulfide. Other phosphorus sulfides, such as phosphorus sesquisulfide and the like, may be employed in a similar fashion.

Inasmuch as many condensation products contemplated by the invention are readily workable only at relatively high temperatures, i.e., 350° to 450° F., an alternative method for modifying such products is advantageously employed when reagents are utilized which may be unstable at such high temperatures. Such alternative procedure embraces first blending the condensation product which is to be modified, with an appropriate base stock in suitable proportions, followed by the addition of the desired quantity of reagent. More specifically, the condensation products may be mixed in proportions from about 20% to 50% by weight with, for example, the ultimate base stock in which they are to be utilized. To the mixture so obtained, there is then added from about 1 to about 5% by weight of the desired reagents, based upon the condensation product, preferably in small proportions. This addition may be effected under an inert atmosphere, if desired. The desired reaction is then effected at a temperature of from about 175° F. to 275° F. The ultimate product so obtained is then admixed in appropriate concentration with additional quantities of the base stock employed. This procedure is particularly applicable in the modification of the condensation product through utilization of such reagents as the isocyanates and amines, as above defined.

The condensation products produced in the above-described manner not only constitute excellent suspending mediums for oil-insoluble materials in oleaginous compositions, but additionally exhibit marked viscosity index improving characteristics. Thus when the compositions of the present invention are incorporated into lubricants, power transmission fluids, shock absorber fluids and the like, the viscosity index and detergency or the viscosity index and oxidation stability of the base composition simultaneously may be enhanced. Moreover, oil-insoluble antioxidants may be incorporated into the oxygen-condensed hydrocarbon to enhance its own resistance to oxidation and thereby permit its utilization as a viscosity index improving agent in very high temperature service.

The method which is used to disperse an inorganic alkaline earth salt through the oxygen-condensed hydrocarbon is we believe unique as is the resultant product. Such dispersion most appropriately may be accomplished by blending an oil-compatible alkaline earth metal organic salt with the oxygen-condensed hydrocarbon and converting the alkaline earth metal organic salt to an alkaline earth inorganic salt in situ by contacting the mixture with an acidic gas. The acidic gas liberates the organic constituent of the alkaline earth organic salt and results in a dispersion of alkaline earth inorganic salt throughout the oxygen-condensed hydrocarbon. More particularly described, this process embodiment of the invention comprises blending an oil-compatible alkaline earth organic salt with an oxygen-condensed hydrocarbon and contacting the mixture while at a temperature of from about 250° to about 500° F., and preferably from about 350° to about 450° F., with an acidic gas. The acidic gas is used in sufficient quantity to allow the law of mass action to take place. The equilibrium will eventually be displaced by removing the volatile constituent of the alkaline earth metal organic salt.

Since barium carbonate exhibits excellent detergency characteristics when blended with lubricating compositions, a particularly preferred embodiment of the process comprises blending a barium phenate, preferably octyl or nonyl phenate, with an oxygen-condensed hydrocarbon and contacting the mixture while at a temperature of from about 250° to about 500° F., and preferably from about 350° to about 450° F., with a mixture of carbon dioxide and steam.

The oil-compatible alkaline earth metal organic salts operable in the invention include the alkaline earth metal salts of a wide variety of organic compounds. The organic compounds must be capable of forming metallic salts and preferably have ionization constants (measured in water at 25° C.) greater than about $1 \times 10^{-10}$ and exhibit a pH less than about seven. They include phenolic compounds, enolizable organic compounds, lower molecular weight aliphatic carboxylic acids, lower molecular weight hydroxy aliphatic carboxylic acids, and the like. While higher molecular weight organic compounds provide greater solubility, in order that the organic compound may be recovered from the alkaline earth organic metal salt-oxygen condensed hydrocarbon reaction mixture, the organic constituent from which the alkaline earth salt is formed preferably has an appreciable vapor pressure below about 600° F. to permit its removal from the reaction by the sweep gases.

Specific ionizable organic constituents of the alakline earth organic salts which appropriately may be employed in the invention include, without limitation, phenolic compounds such as phenol, xylenol, ethyl phenol, butyl phenol, propyl phenol, p-tert-butyl phenol, pentyl phenol, heptyl phenol, octyl phenol, nonyl phenol, dodecyl phenol, cresol and alkylated cresol; alkylated polyhydroxyaromatic compounds such as octyl-catechol and nonyl catechol; alkylated hydroxyl aromatic carboxylic acids such as octyl salicylic acid and nonyl salicylic acid; aliphatic carboxylic acids such as acetic acid, butyric acid, propionic acid, caprylic acid and the like; and organic chelating agents such as isovaleryl acetonate.

The methods of blending the alkaline earth metal salts with the oxygen-condensed hydrocarbons will vary depending upon the characteristics of the alkaline earth metal organic salt. If the alkaline earth metal organic salt is oil-soluble, the salt appropriately may be dissolved in a diluent oil and blended with the oxygen-condensed hydrocarbon. If the alkaline earth metal organic salt is not per se soluble in oil but is oil-soluble in its hydrated form, the salt may be combined with an appropriate amount of water of hydration and then combined with an oil diluent. In the event that the alkaline earth metal organic salt is not totally soluble in oil, it may be slurried with an oil diluent and blended with an oxygen-condensed hydrocarbon as a slurry. The optimum method of blending employed is, therefore, dependent upon the precise characteristic of the individual alkaline earth metal organic salt.

While the lower viscosity microgels may be sufficiently fluid to permit blending, the higher viscosity microgels normally are diluted in a diluent oil prior to the blending described above.

In the event that the alkaline earth organic salts are not readily available, the salts advantageously may be formed in diluent oil by reacting the above-identified organic compounds with an inorganic alkaline earth metal compound wherein anionic radicals are, for example, hydroxyl, sulfide, hydrosulfide, halide, hydride, basic carbonate, and the like. Preferred inorganic alkaline earth metal compounds are those having a pH greater than about seven.

The gaseous acidic materials which are operable in the process of the present invention to free the oil-insoluble material include those inorganic acids which are gaseous at the reaction temperature. These will include, for example, $HNO_3$, $HCl$, $SO_2$, $SO_3$, $CO_2$, $H_2S$, $ClO_2$, and the like. In order to provide an appropriate environment, steam desirably is injected with the gaseous materials. Steam serves to ionize the acidic material and functions as a carrier for other acidic compounds such as $H_3BO_3$ which are not readily vaporized at the reaction temperature. In the event the alkaline earth organic salt is employed in the hydrated form, the steam may be omitted.

The rate of introduction of acidic gas into the reaction mixture is not critical to the operability of the reaction. The specific rate of acidic gas addition will depend upon equipment limitations and time considerations. It is preferred, however, that the amount of acidic gas introduced into the reaction mixture be sufficient to provide at least a slight excess of acidic gas. It has been found that higher rates of acidic gas act as a gaseous sweep and aid materially in the removal of the liberated organic constituent of the alkaline earth metal organic salt. If it is desired, an inert gas may be added to the acidic gas, thereby increasing the effectiveness of the gaseous sweep.

It is preferred that steam be employed in sufficient amounts to provide at least one equivalent of steam per equivalent of acid. The temperature of the steam may vary from 212° F. to 500° F. or more, but the steam preferably is introduced at a temperature which approximates the temperature of the reaction mixture.

The physical equipment employed to effect the dispersion of an alkaline earth metal inorganic salt in the oxygen-condensed hydrocarbon is not critical so long as means are provided for bringing the reactants into intimate contact. The reaction vessel should contain agitating means to blend the reactants, and, additionally, should be provided with means for effecting an intimate sparging of the organic salt with the acidic gas. A vessel having a multiplicity of gas inlets is preferred.

For purposes of specific illustration, a preferred process for the dispersion of barium carbonate in an oxygen-condensed hydrocarbon is described below:

Stoichiometric amounts of barium hydroxide containing 16 moles of water per mole of hydroxide and nonyl phenol are added to a medium neutral raffinate to produce a mixture of barium nonyl phenate in the medium neutral raffinate. The solution so formed is added incrementally to a 20% concentration of oxygen-condensed hydrocarbon in a medium neutral raffinate. After each increment the mixture is stirred for twenty minutes to insure a thorough blending of the materials. The stirred mixture is then contacted with carbon dioxide and steam for twenty minutes. Following the stirring of the final increment, the reaction mixture is contacted with carbon dioxide and steam until nonyl phenol is no longer liberated from the reaction mixture. The final product is a stable dispersion of finely divided barium carbonate in oxygen-condensed hydrocarbon in accordance with the invention.

The process may be employed to produce an oxygen-condensed hydrocarbon containing a barium content up to two times or more by weight of the oxygen-condensed hydrocarbon. The products so formed are extremely stable and will exhibit no precipitation of the suspended barium carbonate even after prolonged periods of storage. Such dispersions are also stable in the presence of water.

Calcium carbonate may be suspended in a sulfur-condensed hydrocarbon following the above-described process except that water of hydration products no advantageous result in the case of calcium and therefore need not be added in the preliminary stage of the process.

Inorganic alkaline earth salt-containing additives heretofore have been prepared by adding, as essential reactants, an alkaline earth compound such as barium hydroxide, water and a promoter such as an alkyl phenol, to an acidic organic compound, reacting at about 300° to 340° F. and then blowing with carbon dioxide to increase the alkaline earth metal content. The alkyl phenol is not recovered. The reaction product obtained is an organic acid complex, colloidal in nature, which contains greater than the normal alkaline earth metal content required to neutralize acidic groups.

The additives of the present invention are of an entirely different nature and are prepared by an entirely different mechanism. Initially, the oxygen-condensed hydrocarbons employed as a suspending medium in the present invention contain no titratable acidity whatsoever. The alkaline earth metal alkyl phenate employed does not react or complex with the condensed hydrocarbon but is merely physically suspended therein. The water employed with barium alkyl phenate, for example, is not an essential reactant but is present to aid in solubilizing the phenate in the diluent oil which may be employed. Similarly, alkyl phenol is recovered when, in accordance with the invention, the acidic gas is introduced to produce colloidal inorganic alkaline earth metal salt in physical suspension in the condensed hydrocarbons.

It was attempted to produce an additive by substituting the non-acidic condensed hydrocarbon of the present invention for the acidic organic compound of the above-described prior art process. Inoperable gels were obtained which could not be filtered and which would not disperse in oil as compared with the readily filtrable, readily dispersible microgels of the invention.

The following examples are presented for purposes of more specific illustration of the compositions and processes of the invention. It is not intended that the scope of the invention be limited by the specific embodiments described.

A.—PREPARATION OF OXYGEN-CONDENSED MICROGEL

Example I.—Separation from cylinder stock of viscous hydrocarbons for use in the preparation of dispersing mediums About 75,000 grams of a cylinder stock derived by distillation from paraffin-base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F., were mixed with propane, heated to a temperature of about 190° F. and then cooled to a temperature of about 65° F. The cylinder stock-propane solution thereafter was transferred into a chilling tank wherein the pressure was reduced to an extent requisite to volatilize sufficient propane to lower the temperature of the solution from about −20° F. to about −50° F. Makeup propane was added during the chilling operation, such that the ratio of propane to cylinder stock was about 3 to 1 at the end of the chilling cycle. During the chilling cycle, petrolatum was precipitated from the solution. The chilled cylinder stock-propane solution containing precipitated petrolatum was transferred to a filter feed tank and thence passed through an appropriate filter to effect removal of the petrolatum from the chilled solution.

Propane was added to the filtrate in an amount sufficient to raise the propane-cylinder stock ratio to about 10 to 1 and the temperature of the solution so obtained was elevated to about 150° F. to 180° F. whereupon about 15,000 grams of high molecular weight viscous materials were precipitated. The viscous materials still contained some propane.

The material so obtained was mixed at a temperature of about 130° F. to 135° F. with additional propane to increase the propane-oil ratio to about 20 to 1. The temperature of the resulting solution was lowered to about 100° F. whereupon about 6,000 grams of viscous hydrocarbons were precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution was heated to about 150° F. whereupon 9,000 grams of additional viscous hydrocarbons which are designated as light resins, were precipitated. Any residual propane was removed in a flash chamber. These hydrocarbons are characterized by a molecular weight of about 1300, a viscosity of about 1150 SUS at 210° F., and a bromine number of about 4.0.

Oxygen condensation

About 9,000 grams of the viscous materials separated from the cylinder stock, in the manner above described and designated as light resin, and 1,000 grams of bright stock were charged to suitable apparatus and initially heated to a temperature of 500° F. Air was passed through the mixture at a rate of about 60 cu. ft./gal./hr. Air was added continuously for approximately six hours at a temperature of approximately 500° F. to produce a final product characterized by a ring and ball softening point of about 145° F. The bright stock referred to was a fraction of Pennsylvania paraffin-base crude oil having a boiling point range greater than about 850° F., a viscosity of about 150 SUS at 210° F. and obtained by solvent dewaxing and deresining of cylinder stock.

Example II

A microgel was prepared in a manner identical to Example I with the exception that the condensation process was terminated when the product was characterized by a ring and ball softening point of about 200° F.

Example III

The process of Example I was repeated but in this instance the condensation process was stopped at a point requisite to produce a microgel having a ring and ball softening point of about 286° F.

Example IV

The process of Example I was repeated but in this instance air was passed through the mixture for approximately 8 hours to produce a final product characterized by a ring and ball softening point of about 250° F.

When 10% of the condensed hydrocarbon was blended with a neutral oil having a viscosity of 60 SUS at 100° F. derived from Pennsylvania paraffin-base crude oil by redistillation of a wide boiling primary distillate which had undergone chilling to remove wax, the viscosity index of the oil was improved from 88.7 to 165.6.

Example V

The process of Example I was repeated except that the condensation process was stopped at a point requisite to produce a microgel having a ring and ball softening point of about 130° F.

When 10% of this condensed hydrocarbon material was blended with the neutral oil fraction described in Example IV, the viscosity index of the oil was increased from 88.7 to 152.1.

Example VI

The process of Example I was repeated except that the condensation process was stopped at a point requisite to produce a microgel having a ring and ball softening point of about 160° F.

When 10% of this condensed hydrocarbon material was blended with the neutral oil fraction described in Example IV, the viscosity index of the oil was increased from 88.7 to 156.5.

Example VII

The process of Example I was repeated except that the condensation process was stopped at a point requisite to produce a microgel having a ring and ball softening point of about 190° F.

When 8% of this condensed hydrocarbon material was blended with the neutral oil fraction described in Example IV, the viscosity index of the oil was increased from 88.7 to 159.3.

Example VIII

The process of Example I was repeated except that the condensation process was stopped at a point requisite to produce a microgel having a ring and ball softening point of about 220° F.

When 7% of this condensed hydrocarbon material was blended with the neutral oil fraction described in Example IV, the viscosity index of the oil was increased from 88.7 to 164.3.

Example IX

The process of Example I was repeated except that the condensation process was stopped at a point requisite to produce a microgel having a ring and ball softening point of about 270° F.

When 7% of this condensed hydrocarbon material was blended with the neutral oil fraction described in Example IV, the viscosity index of the oil was increased from 88.7 to 162.7.

Example X

An oxygen-condensed microgel was prepared from a fraction of Pennsylvania paraffin-base crude oil designated as heavy resin described in Example I, which had been further processed by solvent extracting with phenol to a 65% raffinate yield.

The material above described was characterized by an average molecular weight of about 1680, a viscosity of about 1550 SUS at 210° F., a bromine number of 1.2, and was substantially wax- and asphalt-free. This material was heated to a temperature of about 475° F. and air added continuously while the reaction mixture was maintained within a temperature range of 450–500° F. for a time requisite to produce a product having a ring and ball softening point of about 154° F.

Example XI

Example X was repeated with the exception that the condensation reaction was continued to produce a product having a ring and ball softening point of about 250° F.

Example XII

Example X was repeated with the exception that the condensation reaction was continued to produce a product having a ring and ball softening point of about 270° F.

Example XIII

The process of Example X was repeated with the exception that the condensation reaction was continued for a time requisite to produce a product having a ring and ball softening point of about 245° F.

When 10% of this oxygen-condensed hydrocarbon material was blended with the neutral oil described in Example IV, the viscosity index of the oil was increased from 88.7 to 159.9.

Example XIV

Oxygen-condensed microgels were prepared with the variations of starting materials and ring and wall softening points in the final condensation products as indicated in Table I.

TABLE 1

| Oxygen-condensed materials | R&B Soft. Pt., ° F. | V.I. of blend in 60/100 neutral | |
|---|---|---|---|
| | | 4% | 10% |
| Heavy resin [1] | 89 | | 115.7 |
| | 260 | 140.9 | 131.2 |
| Light resin [2] | 69 | | 115.8 |
| | 254 | 156.2 | 133.0 |
| Solvent refined paraffin base bright stock.[3] | 66 | | 105.2 |
| | 264 | 145.0 | 125.0 |
| Solvent extracted mixed base bright stock.[4] | 254 | 135.3 | 96.6 |
| Light resin, 85% raffinate [5] | 80 | | 124.0 |
| | 258 | 166.3 | 140.6 |

[1] The heavy resin derived from Pennsylvania base crude oil and described in Example I.
[2] Light resin derived from Pennsylvania base crude as described under Example I and characterized by a viscosity at 210° F. of 1210 SUS and an average molecular weight of about 1,110.
[3] Solvent refined paraffin base bright stock derived by propane dewaxing of Pennsylvania crude residual cylinder stock and phenol extraction to a 92.0% raffinate yield. This stock is characterized by a viscosity at 210° F. of about 140 SUS, a viscosity index of about 102, a flash point of about 550° F. and a pour point of +15° F.
[4] Solvent extracted mixed base bright stock prepared by solvent treatment of a mid-continent base crude residuum and characterized by a viscosity of 152.8 SUS at 210° F., a bromine number of 2.4, and a molecular weight of about 770.
[5] The light resin described above but phenol extracted to an 85% raffinate yield and characterized by a viscosity at 210° F. of about 915 SUS and an average molecular weight of gout 1,350.

Example XV

About 100 parts by weight of a bright stock extract, which is a fraction of Pennsylvania crude oil removed from Pennsylvania bright stock by phenol extraction, was employed as the starting materials for the production of the oxygen condensation product useful as a suspending medium in accordance with the invention. The bright stock extract employed was characterized by the following physical properties:

Gravity, degrees _____ API__ 10.4
Viscosity at 100° F. _____ SUS__ 840,000
Viscosity at 210° F. _____ SUS__ 1210
Viscosity index _____ —173

The bright stock extract was condensed with oxygen under the conditions corresponding to those described in Example I to produce a final product having a ring and ball softening point of about 248° F.

Example XVI

The process of Example XIII was repeated with the exception that in this instance there was employed in lieu of the starting material described in Example XIII a bright stock raffinate produced as follows and having the following properties:

The bright stock referred to in Example I was extracted with phenol to a 92% raffnate yield and was characterized by a viscosity of about 140 SUS at 210° F., a bromine number of 7.1 and a molecular weight of about 690.

The neutral oil of Example IV containing 10% of the oxygen-condensed raffinate exhibited a viscosity index of 157.3.

Example XVII

The process of Example XIII was repeated with the exception that in this instance petrolatum resin was employed as a starting material. The petrolatum resin was obtained by treating the petrolatum described in Example I with propane so that the propane: oil ratio was approximately 10:1, and heating the resulting mixture to about 135–160° F. Petrolatum resin which was thereby precipitated from the solution was characterized by a viscosity of about 2800 SUS at 210° F., a gravity of about 18.6 API and a wax content of about 40%. The 60 at 100 neutral oil described in Example IV containing 10% of the condensed resin exhibited a viscosity index of 152.9.

Example XVIII

The process of Example I was repeated with the exception that in this instance the reaction mixture was maintained at a temperature of 425° F. during the blowing operation. A product having a ring and ball softening point of about 250° F. was obtained after about 15 hours. The product was analogous in other respects to the product of Example I.

Example XIX

The process of Example I was repeated with the exception that in this instance the reaction mixture was maintained at a temperature of 575° F. during the blowing operation. A product having a ring and ball softening point of about 250° F. was obtained after about 5 hours. The product was analogous in other respects to the product of Example I.

Example XX

The process of Example I was repeated with the variations of starting material and ring and ball softening points of the final condensation products as indicated in Table 2. The effectiveness of these condensed hydrocarbons when blended with the 60 and 100 neutral oil described in Example IV is reflected by the data which appears in Table 2.

TABLE 2

| Air blown materials | Ring and ball softening point of V.I.I., °F. | Percent V.I.I. in blend | V.I. |
|---|---|---|---|
| Bright stock, 83.5% raffinate (zero pour)[1] | 242 | 10 | 159.6 |
| Solvent extracted mixed base bright stock[2] | 241 | 10 | 159.9 |
| Light resin, 58% raffinate[3] | 188 | 5 | 168.4 |
|  | 228 | 5 | 169.1 |
|  | 270 | 4 | 174.8 |
| Heavy resin, 65% raffinate[4] | 205 | 7 | 164.9 |
|  | 245 | 5 | 170.7 |
|  | 255 | 4 | 172.0 |
|  | 278 | 5 | 171.1 |
| Heavy resin, 44% raffinate (Extraction 307).[5] | 236 | 5 | 168.6 |
|  | 281 | 6 | 166.6 |
|  | 341 | 5 | 165.9 |

[1] The bright stock, 83.5% raffinate (zero pour) is derived by propane dewaxing of Pennsylvania crude residual cylinder stock followed by phenol extraction to a 83.5% raffinate yield. This stock is characterized by a viscosity of 140 SUS at 210° F., a molecular weight of about 740 and a bromine number of about 7.0.

[2] Solvent extracted mixed base bright stock is prepared by solvent treatment of a Mid-continent base crude residuum and is characterized by a viscosity of 152.8 SUS at 210° F., a bromine number of 2.4, and a molecular weight of about 770.

[3] The light resin 58% raffinate is obtained by phenol extraction of the light resins described under Example I and is characterized by a molecular weight of about 1490, a viscosity of 807.2 SUS at 210° F., and a bromine number of about 1.5.

[4] The heavy resin 65% raffinate is prepared by phenol extraction of the heavy resin described under Example I to a 65% raffinate yield and is characterized by a molecular weight of about 1680, and a bromine number of about 1.2, and a viscosity of about 1575 SUS at 210° F.

[5] The heavy resin 44% raffinate is prepared by phenol extraction of the heavy resin described under Example I and is characterized by a molecular weight of about 1570, a viscosity of about 1645 SUS at 210° F., and a bromine number of about 1.5.

Example XXI

The process of Example I was repeated to produce a condensed hydrocarbon having a ring and ball softening point of 230° F. The product so produced was then admixed with about 0.5% by weight of flowers of sulfur and heated under an atmosphere of nitrogen for a period of about 2 hours at a temperature of about 500° F.

A dewaxed paraffin base oil fraction derived from Pennsylvania crude oil and characterized by a viscosity at 100° F. of about 60 SUS containing 10% of the condensed hydrocarbon exhibited a viscosity index of 157.6. The viscosity index of the base oil was 88.7.

Example XXII

The process of Example I was repeated with the exception that the blowing was terminated at a point requisite to produce a material characterized by a ring and ball softening point of about 217° F. The temperature of the product was lowered in the final stages of the blowing process from about 500° F. to about 400° F. and the blowing then was discontinued. Fifty grams of flowers of sulfur were then added and the mixture agitated with nitrogen while maintained at a temperature of about 400° F. for a period of about 2 hours to obtain a final end product having a ring and ball softening point of about 277° F. and a sulfur content of about 0.13% by weight.

Example XXIII

The process of Example I was repeated to produce an oxygen-condensed hydrocarbon having a ring and ball softening point of 220° F. The product so obtained was then admixed with sufficient $P_2S_5$ under an atmosphere of nitrogen and heated for a period of about 2 hours at a temperature of about 500° F. to produce an ultimate product characterized by a ring and ball softening point of about 250° F.

The oil described in Example XXI containing 10% of this condensed hydrocarbon exhibited a viscosity index of 154.2.

Example XXIV

The procedure of Example XXIII was repeated with the exception that the blowing process was stopped at the time the condensation product was characterized by a ring and ball softening point of about 237° F. Sufficient $P_2S_5$ was introduced into the condensation product while at a temperature of about 240° F. and these reactants were maintained at this temperature for about 120 minutes to obtain an ultimate product characterized by a ring and ball softening point of 249° F.

Example XXV

The process of Example I was repeated with the exception that the blowing process was stopped at a point requisite to produce a product having a ring and ball softening point of about 120° F. The product so produced was then treated at a temperature of 500° F. with 1% by weight thereof of phosphorus pentasulfide added in four ¼% increments, each increment every fifteen minutes. The phosphorus pentasulfide modified product was characterized by a ring and ball softening point of 184° F. This product was further treated at 500° F. with about 3⅜% by weight, based on the original blown product prior to treatment with phosphorus pentasulfide, of elemental sulfur added in small increments over a period of approximately five hours to produce a final product characterized by a ring and ball softening point of 242° F. and containing 0.19% by weight of phosphorus and 1.34% by weight of sulfur.

The 60 at 100 neutral oil described in Example IV containing 4% by weight of this modified condensation product exhibited a viscosity index of 136.7.

Example XXVI

A light resin raffinate obtained by phenol extraction of the light resins described in Example I to an 85% raffinate and characterized by an ebullioscopic weight of about 1350 and a viscosity at 210° F. of about 916 SUS was oxygen-condensed in a manner similar to that described in Example I to a ring and ball softening point of about 188° F. The oxygen-condensed raffinate was reacted at a temperature of about 400° F. for a period of about one hour with about ½% of a mixture of polyalkylene polyamines which was predominantly diethylene triamine and triethylene tetramine. The ring and ball softening point of the reaction product was 220° F.

Example XXVII

Example XXVI was repeated with the exception that the light resin raffinate oxygen-condensed microgel had a ring and ball softening point of about 216° F. Such product was treated with about 2% by weight of diphenylamine under the same conditions and in the same manner as described in Example XXVI.

Example XXVIII

A light resin raffinate oxygen-condensed microgel of the type described in Example XXVI but having a ring and ball softening point of about 249° F. was reacted with ammonia gas for a period of about one hour at a temperature of 500° F. Gaseous ammonia was passed through the reaction mixture at the rate of about 8 liters per hour. The reaction product had a ring and ball softening point of about 260° F. and contained 0.8% chemically combined nitrogen.

Example XXIX

Approximately 5,670 grams of 90% light resin, as described in Example I, were blended with 10% bright stock raffinate described in footnote 1 of Table 2, and were airblown at a temperature of about 500° F. to a ring and ball softening point of about 200° F. The product was lowered to a temperature of about 430° F., at which time about 383.5 grams of elemental sulfur were added. After a reaction time of about four hours, the ring and ball softening point of the product was about 290° F. and the product contained about 1.63% sulfur. To about 5,200 grams of this product there were added 244 grams of diphenylamine while the reaction mixture was held at a temperature of about 400–450° F. for two hours.

The final product exhibited a ring and ball softening point of 293° F.

Example XXX

Three thousand eight hundred and sixty grams of the mixture of light resin and bright stock raffinate described in Example XXIX were air-blown at a temperature of about 500° F. to a ring and ball softening point of about 190° F. At this point there was added 10% by weight of a mixture of polyalkylene polyamines consisting predominantly of diethylene triamine and triethylene tetramine. The temperature of the reaction mixture was maintained at 400° F. for a period of two hours, following which the product was stripped of volatile light ends by bubbling nitrogen vigorously therethrough.

Example XXXI

The process of Example I was repeated with the exception that the blowing process was terminated at a point requisite to provide a condensation product having a ring and ball softening point of 180–200° F. 311.8 grams of the condensation product so obtained were heated to a temperature of about 400° F. and 0.78 gram of tolylene diisocyanate were added. The temperature of the mixture was maintained at 400° F. with agitation for about 20 minutes, during which time the reaction mixture thickened. The product so obtained was characterized by a ring and ball softening point of about 245° F. This material, when blended in the proportion of about 10° by weight with the 60 SUS at 100° F. neutral oil described in Example IV, raised the viscosity index of the oil from 88.7 to 163.0.

B.—INCORPORATION OF OIL-INSOLUBLE MATERIAL INTO THE OXYGEN-CONDENSED HYDROCARBONS

Example XXXII

Approximately 100 parts by weight of an oxygen-condensed light resin raffinate having a ring and ball softening point of about 188° F. was blended with 400 parts by weight of a medium neutral raffinate. This blend was heated to a temperature of 400° F. There then was added in four equal increments at intervals of about twenty minutes approximately 400 parts by weight of barium nonyl phenate and 250 parts by weight of the same medium neutral raffinate. After each addition the mixture was stirred for ten minutes and then contacted with carbon dioxide and steam for a period of ten minutes. After the final increment, the carbon dioxide and steam sparge was maintained for a period of about forty-five minutes. The exhaust gases carrying freed nonyl phenol were passed through a condenser and finally through a benzene scrubber.

After the resulting product was centrifuged and filtered, it was found to contain 10.90% barium as compared to a theoretical value of about 10.3%.

This product was diluted with the same medium neutral raffinate until a stable dispersion containing 5% of the product was obtained. No evidence of instability has been observed after more than one year of storage.

Example XXXIII

One and a half parts by weight of barium nonyl phenate containing 18.03% by weight of barium were blended with one part by weight of a medium neutral raffinate, i.e., a solvent extracted neutral obtained from a Pennsylvania paraffin-base crude and having a viscosity of about 45 SUS at 210° F. and a boiling range of about 740° F. to about 850° F., together with one part of water for each 12½ parts of phenate to provide a more comparable mixture. The blend so produced was added in six increments to a mixture of one part by weight of the oxygen-condensed hydrocarbon described in Example IV, and four parts by weight of the same medium neutral raffinate. The mixing was effected at a temperature of 220° C. Subsequent to the addition of each increment, the mixture was stirred for thirty minutes and blown with carbon dioxide for an additional thirty minutes, with the exception of the final increment, the addition of which was followed by a thirty minute stirring period and a sixty minute period of blowing with carbon dioxide.

The exhaust gas which carried nonyl phenol, was passed through a condenser to a benzene scrubber. 65.7% by weight of the nonyl phenol was recovered.

The finally produced blend was centrifuged and filtered and contained 3.12% barium. This blend was diluted with the same medium neutral raffinate to a concentration of 8⅓% by weight thereof in said raffinate. At this dilution, the viscosity index of the mixture was 108.4. A comparative mixture containing 10% by weight of the oxygen-condensed hydrocarbon exhibited a viscosity index of 125.8.

Example XXXIV

Four hundred thirty grams of nonyl phenol, 74.1 grams of calcium hydroxide and 504.1 grams of ethylene glycol were refluxed at a temperature of 310° F. for eight hours. There were then added 468.1 grams of medium neutral raffinate. Following removal of the ethylene glycol by distillation under vacuum, a 50% concentrate of calcium nonyl phenate in oil was obtained. The mixture contained 3.34% calcium.

In a separate vessel, approximately 400 grams of a 20% concentrate of oxygen-condensed light resin raffinate (185° F. ring and ball softening point) in medium neutral raffinate was heated to 400° F. The calcium nonyl phenate concentrate obtained above was added to the oxygen-condensed hydrocarbon in four increments. The reaction mixture was stirred for thirty minutes and carbon dioxide and superheated steam were sparged into the mixture for ten minutes. The carbon dioxide addition rate was 0.5 liter/minute, while the steam was admitted at the rate of about 5.0 liters per minute. This procedure was repeated until all four increments had been added. The carbon dioxide-steam blowing was then continued for a period of about five hours. Upon completion of the reaction, the calcium treated oil was filtered through a filter paper, and the calcium concentration determined by the sulfated ash method (ASTM B 874–51). The calcium concentration was found to be 3.50% as opposed to a theoretical concentration of 4.73%. The additive thus prepared was completely compatible with hydrocarbon oils.

Example XXXV

The light resin raffinate described in Example XXVI was condensed with air at 500° F. until the viscosity of the starting hydrocarbon was increased to about 5200 SUS at 210° F. At this point phosphorus pentasulfide was added incrementally until a total of 3% by weight was introduced into the reaction mixture. The resulting softening point was 170° F. Condensation was completed by slowly adding 1½% by weight of elemental sulfur at 500° F. The ring and ball softening point was increased to about 184° F. The final product was air blown for a short period of time to render it noncorrosive to a copper strip according to ASTM procedure D–130. This condensate contained no free acidity as normally detected by neutralization number titration techniques.

Approximately 100 parts by weight of the condensed hydrocarbon was blended with 400 parts by weight of a medium neutral raffinate. This blend was heated to 400° F. There was added in four equal increments approximately 400 parts of barium nonyl phenate and 250 parts by weight of the same medium neutral raffinate. After each addition the reaction mixture was stirred and then contacted with carbon dioxide and steam for a period of ten minutes. After the final increment, the carbon dioxide and steam addition was maintained until nonyl phenol recovery was completed. The exhaust gases carrying freed nonyl phenol were passed through a condenser and finally through a benzene scrubber.

After the resulting product was filtered, it was found to contain 10.2% barium, as compared with a theoretical value of 10.1%.

Since modifications of the invention will be apparent to those skilled in the art, the invention is intended to be limited only by the scope of the appended claims.

We claim:
1. A composition of matter for incorporation in oleaginous compositions consisting essentially of a normally oil-insoluble alkaline earth metal salt stably dispersed in an oxygen-condensed petroleum hydrocabon resin containing more than 2 naphthenic rings per molecule and not more than 10% of wax type hydrocarbon materials and produced by fractionation of heavy petroleum fraction with a liquified normally gaseous hydrocarbon, said resin having an ebullioscopic molecular weight in excess of about 500 and an SUS viscosity at 210° F. of at least about 400 and a bromine number less than 10 and condensed by heating said resin at a temperature of at least 400° F. with free oxygen for a period sufficient to increase the SUS viscosity at 210° F. by at least 200 greater than that of the original resin, said normally oil insoluble alkaline earth metal salt having been stably dispersed in said oxygen condensed resin by the steps of incorporating into said oxygen condensed resin an alkaline earth metal organic salt compatable with said resin and reacting said salt with an acidic gas.

2. The composition of claim 1 wherein the dispersed oil-insoluble alkaline earth metal salt is in the solid state.

3. The composition of claim 2 wherein the dispersed material is barium carbonate.

4. The composition of claim 1 wherein the dispersed oil-insoluble material is calcium carbonate.

5. The method of stably dispersing an alkaline earth metal salt in a substantially non-acidic oil compatible oxygen condensed hydrocarbon suspending medium produced by contacting a hydrocarbon starting material having an ebullioscopic molecular weight in excess of 500 while at a temperature of at least 400° F. with free oxygen for a period sufficient to increase the SUS viscosity at 210° F. by at least 200 greater than the original resin, which comprises blending an oil-compatible alkaline earth metal organic salt with the oxygen condensed resin, contacting the resulting mixture with an acidic gas and removing the resulting acidic organic constituent.

6. A method as claimed in claim 5 wherein the alkaline earth metal organic salt is an alkaline earth metal salt of a member from the group consisting of phenols, cresols, alkylated polyhydroxy aromatic carboxylic acids, catechols, aliphatic carboxylic acids, and organic chelating agents.

7. A method as claimed in claim 5 wherein the acidic gas is an inorganic acid gas from the group consisting of $HNO_3$, $HCl$, $SO_7$, $SO_3$, $CO_2$, $H_2S$, $ClO_2$, and $H_3BO_3$.

8. A method as claimed in claim 5 wherein a hydration agent is present with the acidic gas.

9. A method as claimed in claim 8 wherein the hydration agent is steam.

10. A method as claimed in claim 5 wherein the resin and organic salt mixture is contacted with the acidic gas at a temperature of about 250° F. to 500° F.

References Cited

UNITED STATES PATENTS

| | | | |
|---|---|---|---|
| 2,427,272 | 9/1947 | Fuller et al. | 252—55 |
| 2,625,510 | 1/1953 | Moore | 252—55 |
| 2,744,872 | 5/1956 | Nelson | 252—55 |
| 2,753,307 | 7/1956 | Foehr et al. | 252—55 |

DANIEL E. WYMAN, Primary Examiner

I. VAUGHN, Assistant Examiner

U.S. Cl. X.R.

252—55, 309

UNITED STATES PATENT OFFICE
CERTIFICATE OF CORRECTION

Patent No. 3,455,823                                      July 15, 1969

Franklin I. L. Lawrence et al.

It is certified that error appears in the above identified patent and that said Letters Patent are hereby corrected as shown below:

Column 1, line 58, "advantages" should read -- advantageous --. Column 4, line 69, "reflnement" should read -- refinement --. Column 5, line 7, "raffnate" should read -- raffinate --; line 8, "raffnates" should read -- raffinates --. Column 12, TABLE 1, footnote 5, line 3 thereof, "gout" should read -- about --. Column 16, line 26, "10°" should read -- 10% --. Column 18, line 12, cancel "type".

Signed and sealed this 21st day of April 1970.

(SEAL)
Attest:

Edward M. Fletcher, Jr.

Attesting Officer

WILLIAM E. SCHUYLER, JR.
                                                       Commissioner of Patents